(12) United States Patent  
Petner

(10) Patent No.: US 8,946,554 B1
(45) Date of Patent: Feb. 3, 2015

(54) CABLE-END WATER SEALING DEVICE FOR WATER-BLOCKING NON-WATER-BLOCKED CABLE

(75) Inventor: Michael F. Petner, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 473 days.

(21) Appl. No.: 12/849,077

(22) Filed: Aug. 3, 2010

(51) Int. Cl.
*H02G 15/02* (2006.01)

(52) U.S. Cl.
USPC ........................................ 174/77 R; 174/74 R

(58) Field of Classification Search
USPC ........... 385/56; 174/88 R, 99 B, 99 R, 113 B, 174/135, 129 R, 133 B, 23 R, 74 R; 361/749, 361/762
See application file for complete search history.

(56) References Cited

U.S. PATENT DOCUMENTS

| | | | | |
|---|---|---|---|---|
| 4,549,037 A * | 10/1985 | Bawa et al. | | 174/667 |
| 4,707,065 A | 11/1987 | Jenkins | | |
| 5,177,806 A * | 1/1993 | Abbott et al. | | 385/76 |
| 6,069,316 A * | 5/2000 | Utke | | 174/652 |
| 6,107,574 A * | 8/2000 | Chang et al. | | 174/77 R |
| 6,464,405 B2 * | 10/2002 | Cairns et al. | | 385/56 |
| 6,573,484 B1 * | 6/2003 | Yue | | 219/541 |
| 6,583,357 B2 * | 6/2003 | Rubenstein et al. | | 174/360 |
| 6,926,793 B2 * | 8/2005 | Nonomura et al. | | 156/293 |
| 7,402,752 B1 * | 7/2008 | Kiely | | 174/84 R |
| 7,414,197 B2 * | 8/2008 | Ortiz et al. | | 174/74 R |
| 8,324,502 B2 * | 12/2012 | Kameda et al. | | 174/77 R |

* cited by examiner

*Primary Examiner* — Boris Chervinsky
*Assistant Examiner* — Pete Lee
(74) *Attorney, Agent, or Firm* — Howard IP Law Group, PC

(57) ABSTRACT

A cable-end water sealing device includes a water-blocking compound, a receptacle and a sleeve. The receptacle defines an interior cavity for receiving an end portion of a non-water-blocked electrical, optical, or electrical/optical (i.e., hybrid) cable. The receptacle includes a stop member for limiting the insertion depth of the cable, an adjoining interior cavity for receiving and transitioning the cable subcomponents and one or more optional overall EMI shield(s) to the outside of the receptacle, and an injection port for injecting the water-blocking compound into both interior cavities of the receptacle to prevent water from migrating from the end of the cable. One or more of the cable subcomponents may include one or more individual EMI shields. Individual insulating sleeves can be provided to electrically isolate the cable subcomponent EMI shield(s) from the receptacle and overall EMI shield(s). A heat recoverable sleeve can be provided for enclosing the receptacle and overall EMI shield(s) after injection of the water-blocking compound.

28 Claims, 5 Drawing Sheets

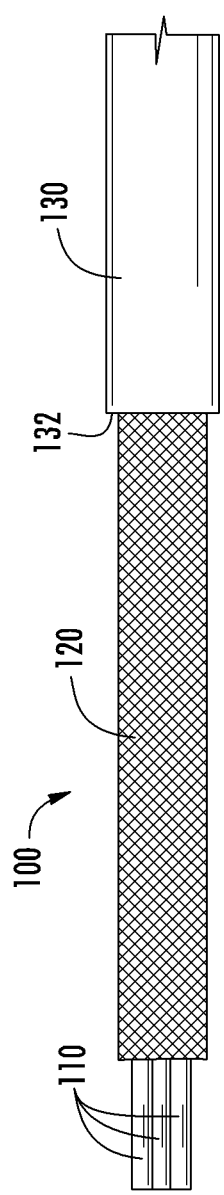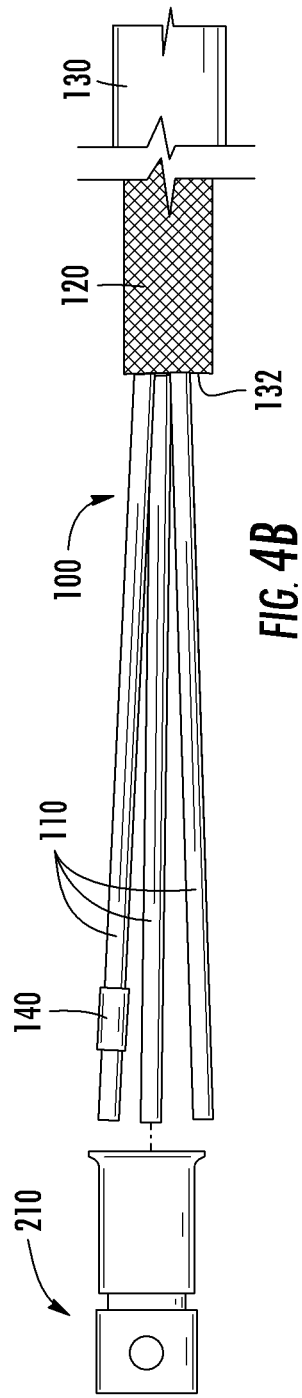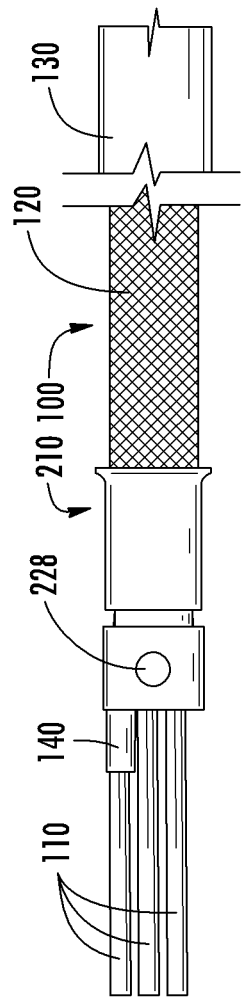
FIG. 4A
FIG. 4B
FIG. 4C

CABLE-END WATER SEALING DEVICE FOR WATER-BLOCKING NON-WATER-BLOCKED CABLE

FIELD

The present disclosure relates to cable water-blocking. More particularly, the present disclosure relates to a cable-end water sealing device and method for water-blocking non-water-blocked cable.

BACKGROUND

With the implementation of commercial off-the-shelf (COTS) technologies into military shipboard environments, commercial non-water-blocked cables are sometimes utilized because equivalent water-blocked military cable designs do not exist. A major reason for the lack of compatible, water-blocked military cables is the lengthy development process required to produce a Qualified Product List (QPL) approved cable possessing the physical, mechanical, chemical, and environmental properties necessary to endure the rigors of the shipboard environment, while also maintaining the electrical and/or optical requirements of the COTS interface.

An additional reason for employing commercial non-water-blocked cables in the military shipboard environment is the need to maintain certain critical electrical parameters of the copper conductors, such as propagation delay and/or dielectric constant, which can be affected by the introduction of the materials and compounds necessary to water-block electrical signal type cable. Furthermore, military system designers who implement the latest COTS technologies into their designs typically fail to consider the shipboard cabling infrastructure until it is too late, thus leaving insufficient time to test and approve a QPL solution to support the COTS interface(s). Consequently, military requirements for using QPL approved water-blocked cables for inter-compartmental cable runs transitioning watertight decks or bulkheads below the V-line of a ship are waived, and commercial non-water-blocked cables are used.

The problem of water-blocking a non-water-blocked cable has been previously addressed with a lengthy, labor intensive manual procedure that is invasive to the cable design because a length of the outer jacket of the cable is removed from both ends of the cable and the internal cable subcomponents are exposed for applying a water-blocking compound. Following this, the environmental integrity of the cable ends need to be reestablished, which involves re-closing the cable via application of additional water-blocking compound and recovery of heat shrinkable tubing (shrinking of the tubing back to its original dimensions via the application of heat) to complete the water-blocking process. The opportunity for disturbing the cable subcomponent (i.e., electrical and/or optical conductor) lay and hence, the electrical and/or optical properties of the conductors and shield(s), is ever-present with this method.

Accordingly, an improved method is needed for water-blocking non-water-blocked cable while preserving the original physical and mechanical properties of the cable, as well as the electrical and/or optical connectivity and integrity of the cable conductors and shields.

SUMMARY

A cable-end water sealing device is disclosed herein. The device comprises a water-blocking compound, a receptacle and a sleeve. The receptacle defining an interior cavity for receiving an end portion of a non-water-blocked cable. The receptacle includes a stop member for limiting an insertion depth of the cable and an injection port for injecting the water-blocking compound into the interior cavity of the receptacle to prevent water from migrating out the end of the cable. The sleeve is provided for enclosing a receptacle-to-cable interface region.

Also disclosed is a water-blocked cable. The water-blocked cable comprises a non-water-blocked cable, a receptacle, a water-blocking compound, and a sleeve. The non-water-blocked cable including at least one cable subcomponent and an outer jacket. A section of the at least one cable subcomponent extends from the outer jacket. The receptacle defines an interior cavity and includes a stop member. The outer jacket of the cable abuts against the stop member to limit its insertion depth into the interior cavity of the receptacle. The water-blocking compound is disposed in the interior cavity of the receptacle and sealingly encapsulates a portion of the at least one cable subcomponent section disposed in the interior cavity of the receptacle. The sleeve encloses the receptacle at a receptacle-to-cable interface region.

Further disclosed is a method for water-blocking a non-water-blocked cable. The method comprises providing a non-water-blocked cable including at least one cable subcomponent and an outer jacket and providing a receptacle. The cable is inserted into one end of the receptacle so that a first portion of the at least one cable subcomponent is disposed in a cable subcomponent interior space of the receptacle, a second portion of the at least one cable subcomponent extends through a corresponding at least one aperture in an end wall of the receptacle, and the outer jacket is disposed in a cable interior space of the receptacle and abutting against a stop member. A water-blocking compound is delivered through a port in the receptacle. A sleeve is applied over the receptacle at a receptacle-to-cable interface region.

BRIEF DESCRIPTION OF THE DRAWINGS

FIGS. 4A-4G are elevational views illustrating an embodiment of a method for water-blocking non-water-blocked cable using the cable-end water sealing device.

DETAILED DESCRIPTION

Figure 1:
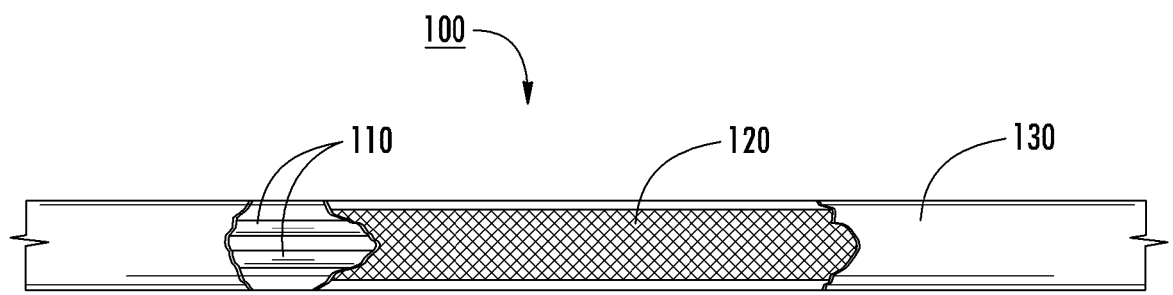
FIG. 1 is an elevational view of an embodiment of a length of non-water-blocked cable.

FIG. 1 illustrates an embodiment of a length of non-water-blocked electrical cable 100. The cable 100 typically includes one or more cable subcomponents or electrical conductors 110. The cable 100 optionally includes one or more overall EMI shield(s) 120 surrounding the one or more cable subcomponents or conductors 110. The overall EMI shield(s) 120 and one or more cable subcomponents 110 are surrounded and encased by an outer jacket 130. One or more of the one or more conductors 110 can each have one or more of their own individual EMI shields (not visible). It should be noted that the discrete cable subcomponents or conductors 110 are not necessarily composed of an individual insulated conductor, but may be comprised of several individually insulated conductors, such as the optimized twisted-pair constructions utilized in the Category type cables (ex. Cat5e, Cat6, etc.).

Figure 2:
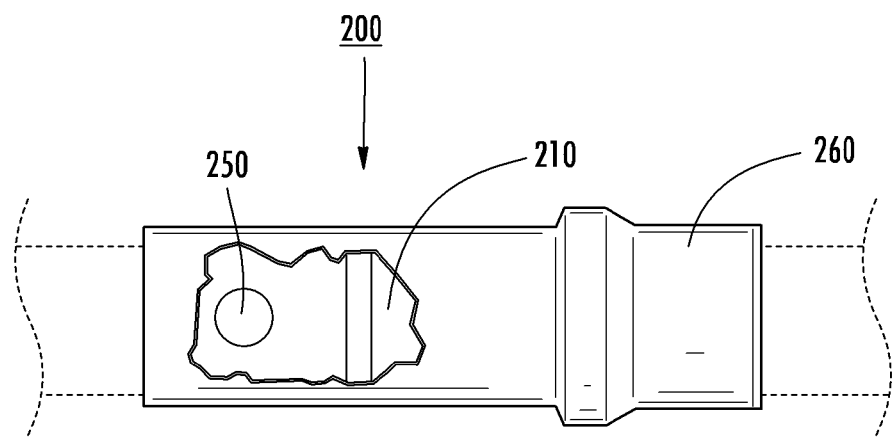
FIG. 2 is an elevational view of an embodiment of a cable-end water sealing device.

FIG. 2 illustrates an embodiment of a cable-end water sealing device, denoted by reference numeral 200. The water sealing device 200 comprises a housing or receptacle 210, a water-blocking sealant or compound 250, and a sleeve 260, which can be a section of adhesive-lined, low temperature heat shrinkable tubing. The sleeve 260 bonds the overall EMI shield(s) 120 to the receptacle 210 and encloses the receptacle 210 at a receptacle-to-cable interface region 211 as shown in FIG. 4F. The sleeve 260 also provides a neat and aesthetically pleasing transition from the cable 100 and cable-end water sealing device 200 to the cable subcomponents 110 and optional overall EMI shield(s) 120. The water-blocking sealant or compound 250 can be an elastomer (flexible) adhesive/sealant that possesses both high peel and high shear strength. Suitable adhesive/sealants include without limitation, single component silicone elastomers, two-part epoxy/amine elastomers, and two-part room temperature vulcanizing (RTV) silicone elastomers. The water sealing device 200 may be applied to the end of the non-water-blocked cable 100, to prevent water egress from cable interstices during a cable flooding scenario. The device 200 maintains the physical and electrical integrity of the original cable conductors 110, individual EMI shield(s) (not visible), and overall EMI shield(s) 120 to the connector/cabinet/equipment interface (thus maintaining the same electrical ground plane(s)), while providing a water-blocking capability to the cable 100 and maintaining the physical and electrical connectivity of the cable conductors 110, individual EMI shield(s), and overall EMI shield(s) 120. The use of the receptacle 210 on the non-water-blocked cable protects both the equipment and shipboard compartments where the equipment resides from water intrusion. The device 200 may be used, without limitation, in shipboard applications where water-blocking is desired and/or required, but a suitable water-blocked cable is not available. In such an application, the device 200 allows the non-water-blocked cable 100 too operate and function like a water-blocked cable.

Referring collectively to FIGS. 3A-3D, the receptacle 210 of the device 200 includes a first end 214 and an opposing second end 216. The receptacle 210 is formed by a cylindrical wall 212 and an end wall 218 that closes off the open first end 214 of the receptacle 210. The cylindrical wall 212 and end wall 218 define an interior cavity 220 of the receptacle 210. In the shown embodiment, the cylindrical wall 212 and the end wall 218 are circular. In other embodiments, the cylindrical wall 212 and end wall 218 may be square, rectangular, oval, or any other suitable shape.

As shown in FIGS. 3A-3D, the end wall 218 includes one or more conductor apertures 222. Each one of the conductor apertures 222 allows a cable subcomponent, along with its individual EMI shield(s) (if present), to extend through the end wall from the interior cavity 220 of the receptacle 210. The conductor apertures 222 separate the cable subcomponents 110 (FIG. 1) from one another, thereby allowing the water-blocking compound 250 (FIG. 2) to completely encapsulate each of the cable subcomponents 110 and their individual EMI shields (if present) by dispersing within, backfilling into all the voids existing within the interior cavity 220 and the interstices between the cable subcomponents 110 of the exposed cable end, and thereby sealing the interior cavity 220 and the conductor apertures 222 of the receptacle 210.

Figure 3A:
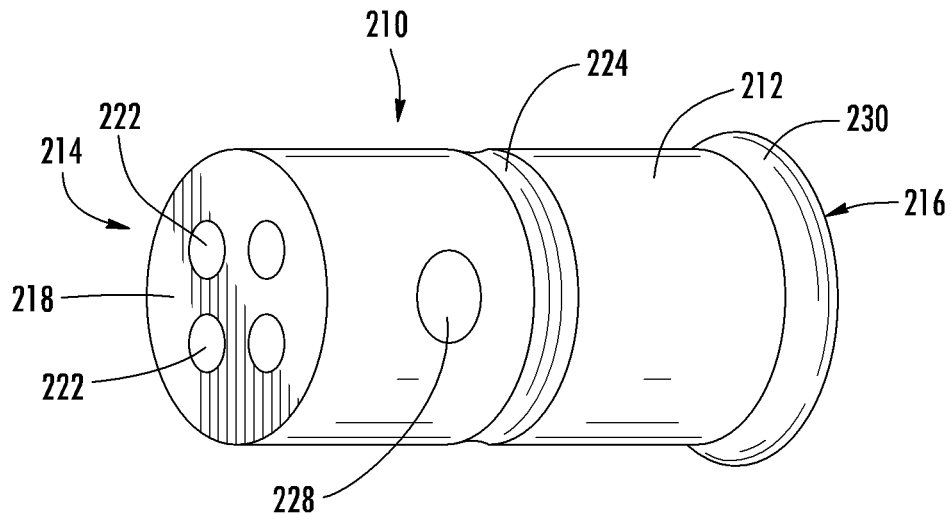
FIG. 3A is a perspective view of an embodiment of a receptacle of the water sealing device of FIG. 2.
Figure 3B:
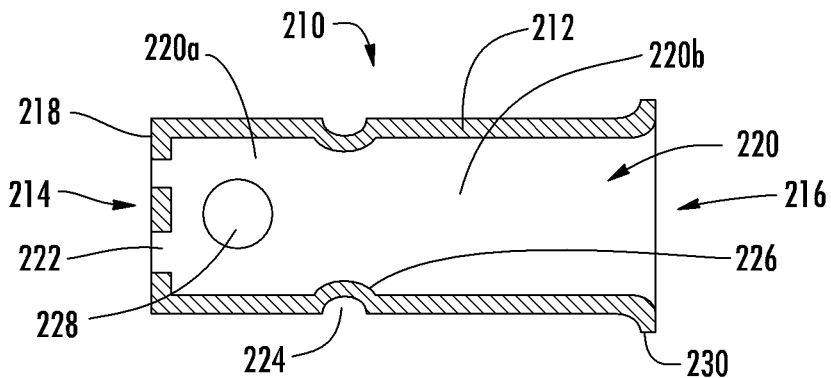
FIG. 3B is a sectional end-to-end view of the receptacle.
Figure 3C:
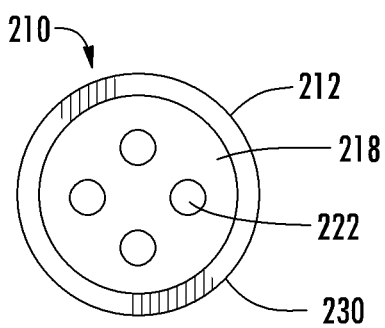
FIG. 3C is an elevational view of a first end of the receptacle.
Figure 3D:
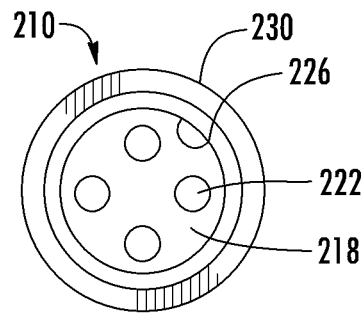
FIG. 3D is an elevational view of a second end of the receptacle.

Still referring to FIGS. 3A-3D, the cylindrical wall 212 of the receptacle 210 includes a U-shape circumferential groove or channel 224 formed therein. As shown in FIG. 3D, the U-shape channel 224 formed in the cylindrical wall 212 defines a corresponding rib-like, circumferential stop member 226 on the inner surface of the cylindrical wall 212. In other embodiments, the stop member 226 may be formed on the inner surface of the cylindrical wall 212 without forming the channel 224. The channel 224 should be located after the mid-point of the cylindrical wall 212 so that it is closer to the first end 214 of the receptacle 210 than the second end 216 of the receptacle 210. The portion of the interior cavity 220 between the end wall 218 and the stop member 226 defines a cable subcomponent space 220a and the portion of the interior cavity 220 between the stop member 226 and the open second end 216 defines a cable space 220b. The cylindrical wall 212 also includes at least one fill or injection port 228 located between the stop member 226 and the end wall 218. The at least one injection port 228 communicates with the cable subcomponent space 220a of the interior cavity 220 of the receptacle 210. The cylindrical wall 212 of the receptacle 210 still further includes an outwardly flared lip or flange 230 formed at the open second end 216 thereof.

The receptacle 210 of the device 200 may be made of metal or any other rigid, electrically conductive material. The receptacle 210 should have transverse dimensions that enable the interior cavity 220 to be slightly larger than the transverse dimensions of the cable 100 to be water blocked, including the optional overall EMI shield(s) 120, if present.

Referring still to FIGS. 3A-3D, the open second end 216 of the receptacle 210 permits insertion of the cable 100 into the cavity 220. When inserted in the cavity 220, a free edge 132 (FIG. 4A) of an outer jacket 130 of the cable 100 abuts against the stop member 226 on the inner surface of the receptacle cylindrical wall 212 to prevent the outer jacket 130 of the cable 100 (FIG. 5) from entering the cable subcomponent space 220a of the receptacle 210. With the free edge 132 of an outer jacket 130 of the cable 100 abutting against the stop member 226 on the inner surface of the receptacle cylindrical wall 212, the exposed sub-components (i.e., individual conductors 110, one or more of which may have conductor EMI shields) extend through the cable subcomponent space 220a and out through conductor apertures 222 in end wall 218 of the receptacle 210. The conductor apertures 222 keep the cable subcomponents 110 separated from one another in the cable subcomponent space 220a. Electrically insulating (e.g., plastic) sleeves 140 (FIG. 4B) may be provided over some or all of the individual conductors 110 where they pass thru the conductor apertures 222 of the end wall 218, when electrical isolation between the overall EMI shield(s) 120 and individual EMI shield(s) is required per cable design requirements.

Still referring to FIGS. 3A-3D, the flared lip or flange 230 formed on the cylindrical wall 212 at the open second end 216 thereof facilitates insertion of the cable 100 into the receptacle 210 of the device 200 and assures electrical contact between the overall EMI shield(s) (when present) and the cylindrical wall 212, when a "Z-fold" is formed in the overall EMI shield(s) 120 (FIG. 4F) later in the assembly process. This Z-fold is used to continue the original overall shield(s) 120 to the EMI housing of an electrical termination device or connector (not shown). The overall EMI shield(s) 120 is/are folded back over the outer cable jacket 130 so that it is sandwiched between the outer cable jacket 130 and the cylindrical wall 212 in a first step of forming the Z-fold.

Still referring to FIGS. 3A-3D, the injection port 228 of the cylindrical wall 212 communicates with the cable subcomponent cavity space 220a where the cable subcomponents or conductors 110 transition thru the conductor apertures 222 in the end wall 218. This port 228 is used to introduce, under pressure, the water-blocking compound 250 into the cable subcomponent cavity portion of the cylindrical wall 212 of the receptacle 210. The water-blocking compound 250 encapsulates and seals the end of the cable 100 (the portion of the cable that has been cut back to expose the overall EMI shield(s) (if present) and cable subcomponents and a small distance into the cable (i.e., ¼ to ½ inch) from the free edge 132), as well as the interstices between the cable subcomponents 110, thus sealing and protecting the end of the cable 100 from water migration. Once sealed, the overall EMI shield(s) 120 is/are then folded forward over the receptacle 210 to complete the Z-fold and thus, continue continuity of the shield 120 forward to the electrical termination or connector device (not shown). The section of adhesive-lined, low temperature heat recoverable sleeve 260 (i.e., heat shrink tubing) is applied over the receptacle 210 and Z-fold areas to complete the water-sealing device 200. An electrical connector or termination device at the end of the cable 100 can then be terminated as normal per the manufacturer's instructions.

Figure 4D:
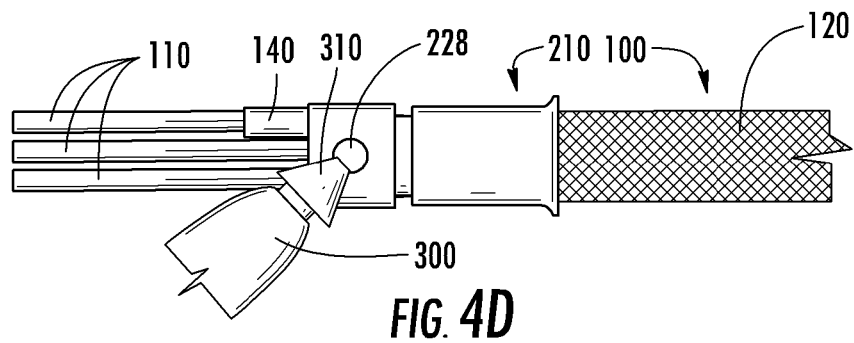
Figure 4E:
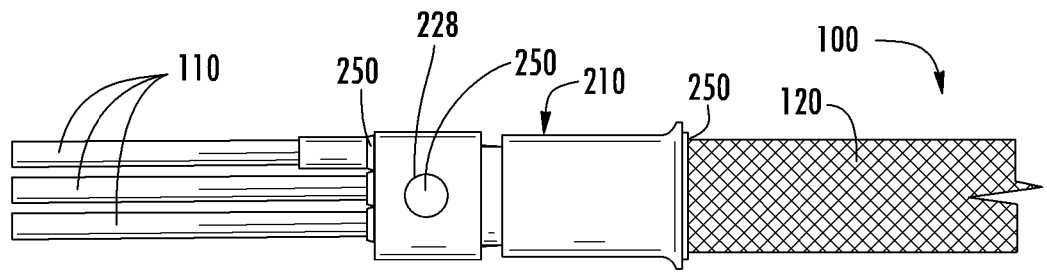
Figure 4F:
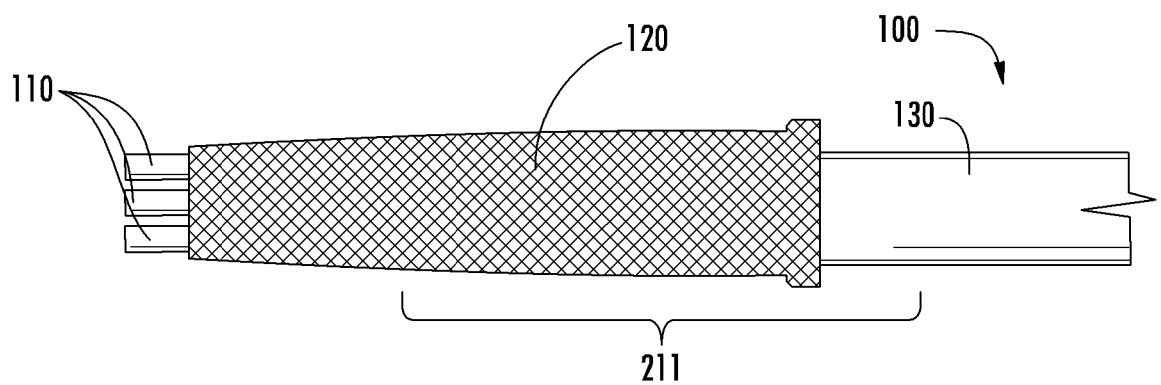

FIGS. 4A-4G, illustrate an embodiment of a method for water-blocking the non-water-blocked cable 100 using the cable-end water sealing device 200 of the present disclosure. The method commences by preparing the non-water-blocked cable 100 for water-blocking. This is accomplished by stripping back the outer jacket 130 of the cable 100 and the overall EMI shield(s) 120 to the appropriate dimensions to expose the one or more conductors 110, as shown in FIG. 4A.

As shown in FIG. 4B, the overall EMI shield(s) 120 is/are folded back over the outer cable jacket 130 to start the Z-fold of the overall EMI shield(s) 120, and the individual conductors 110 are separated from one another. If required, insulator sleeves 140 are slidably placed over the ends of those conductors 110 having their own EMI shields that require isolation from the overall EMI shield(s) 120.

As shown in FIG. 4C, the individual conductors 110 and their individual EMI shields, if present, are threaded through the conductor apertures 222 in the end wall 218 of the receptacle 210 of the water sealing device 200 and the cable jacket 130 with the folded-back overall EMI shield(s) 120 is/are positioned within the cable space portion 220b of the interior cavity 220 of the receptacle 210 of the water sealing device 200 until the free end 132 of the cable jacket 130 (covered by the folded back EMI shield(s) 120) abuts against the stop member 226 on the inner surface of the receptacle cylindrical wall 212. The insulator sleeves 140 used with the individual conductors 110 that have the individual EMI shield(s) are threaded through their respective conductor apertures 222 along with the conductors 110. The insulator sleeves 140 positioned in the apertures 222 prevent contact between the individual EMI shields and the receptacle 210, as the receptacle 210 is electrically connected to the overall shields(s) 120.

An injection device 300 (e.g., "caulk" type gun or syringe) containing the water-blocking compound 250 is used for injecting the water-blocking compound 250 into the receptacle 210, via the injection port 228. The injection device 300 may include a conical tip 310 that fits snugly into the injection port 228 to facilitate injection of the compound 250 under pressure, as shown in FIG. 4D.

The injection device is activated to inject the water-blocking compound 250 into the cable subcomponent space 220a of the interior cavity 220 of the receptacle 210. The water-blocking compound 250 is injected to fill any unoccupied space in the cable subcomponent space 220a and cable space 220b. The injection process continues until the water-blocking compound 250 just emerges from the conductor apertures 222 of the end wall 218 and the flange 230 of the receptacle 210, as shown in FIG. 4E. Any excessive water-blocking compound 250 that emerges from the end wall apertures 222 and the flange 230 of the receptacle 210 during the injection process is removed.

In FIG. 4F, the overall EMI shield(s) 120 is/are folded forward over the receptacle 210 to complete the Z-fold of overall EMI shield(s) 120.

Figure 4G:
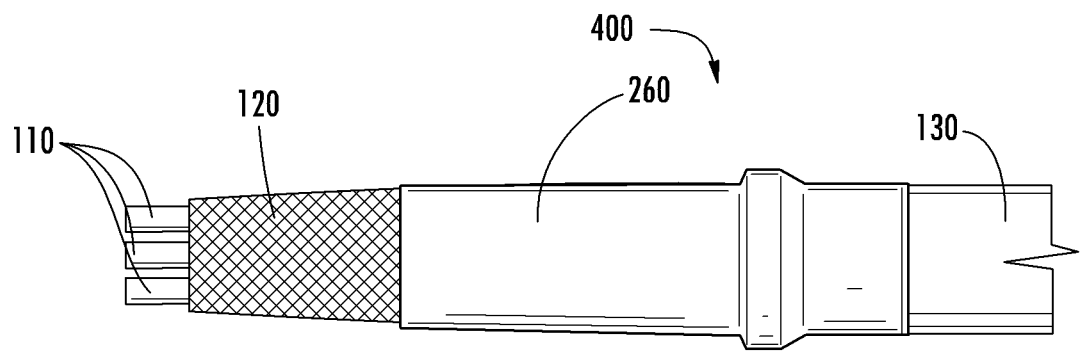
Figure 5:
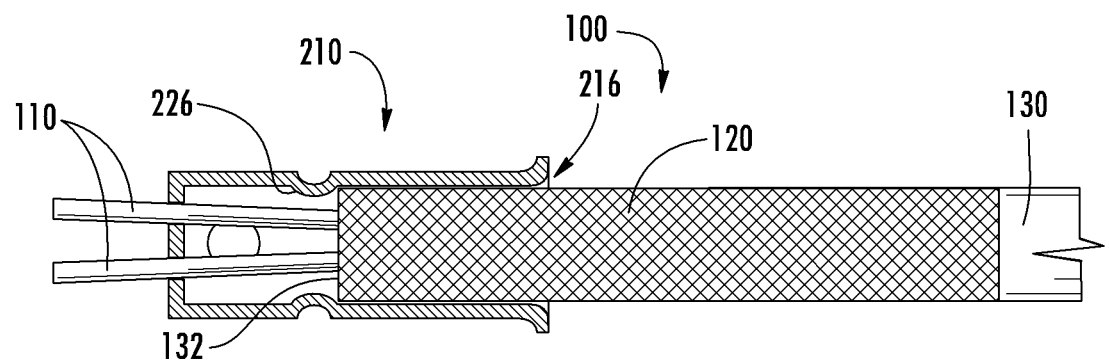
FIG. 5 is an elevational view of a length of non-water-blocked cable and the receptacle, with the receptacle shown in section, illustrating the operation of a stop member of the receptacle.

In FIG. 4G, the length of adhesive-lined, low temperature heat recoverable sleeve 260 is slidably disposed over a short end-segment of the outer cable jacket 130, the water-blocking compound filled receptacle 210, and the Z-folded overall EMI shield(s) 120 to complete the water-sealing device 200, thereby allowing the non-water-blocked cable denoted by reference numeral 400 to operate and function as a water-blocked cable. The end of the cable 400 (the ends of the conductors 110, individual EMI shields, and overall EMI shield(s) 120) may now be terminated with an electrical connector or termination device (not shown) in a conventional manner. The electrical connector or termination device typically functions as an electrical interface from the cable 100 to a piece of equipment requiring the data signals transmitted by the cable.

One of ordinary skill in the art will appreciate that the device and method of the present disclosure can also be applied to non-water-blocked fiber optic cables and non-water-blocked cables with electrical and optical conductors (i.e., hybrid cables).

Although the device and method have been described in terms of exemplary embodiments, they are not limited thereto. Rather, the appended claims should be construed broadly, to include other variants and embodiments of same, which may be made by those skilled in the art without departing from the scope and range of equivalents of same.

What is claimed is:

1. A cable-end water sealing device comprising:
   a receptacle defining an interior cavity for receiving a free end of a non-water-blocked cable, the receptacle including a stop member configured to abut the free end of the cable upon insertion of the cable into the cavity, such that an outer jacket of the cable does not extend past the stop member, the receptacle further including an end wall at a first end thereof, the end wall defining an aperture for allowing a portion of a cable subcomponent of the cable to extend through the end wall, and
   an injection port for injecting a water-blocking compound into the interior cavity of the receptacle to prevent water from migrating to the free end of the cable,
   wherein the interior cavity of the receptacle defines a cable subcomponent space disposed between the end wall and the stop member and a cable space disposed between the stop member and a second end of the receptacle, the cable subcomponent space sized to receive two or more cable subcomponents of the cable, and the cable space sized to receive the outer jacket of the cable.

2. The device of claim 1, further comprising a sleeve for enclosing the receptacle.

3. The device of claim 1, wherein the receptacle includes a cylindrical wall.

4. The device of claim 3, wherein the receptacle includes a second end, wherein the cylindrical wall extends between the first and second ends of the receptacle, and wherein the cylindrical wall and the end wall are formed as a single unit and defining the interior cavity of the receptacle.

5. The device of claim 4, wherein the cylindrical wall and the end wall are circular.

6. The device of claim 3, wherein the cylindrical wall includes a flange at the second end thereof.

7. The device of claim 6, wherein the flange is outwardly flared.

8. The device of claim 3, wherein the cylindrical wall includes an inner surface, the stop member formed on or by the inner surface of the cylindrical wall.

9. The device of claim 1, wherein the end wall includes at least a second aperture for allowing a portion of at least a second cable subcomponent of the cable to extend through the end wall, the apertures spreading the cable subcomponents apart from one another to allow the water-blocking compound therebetween.

10. The device of claim 1, wherein the cable subcomponent includes one or more individual EMI shield(s) and further comprising an insulating sleeve for electrically isolating the one or more individual EMI shield(s) from the receptacle.

11. The device of claim 1, wherein the cylindrical wall includes the injection port.

12. The device of claim 1, wherein the injection port communicates with the cable subcomponent space portion of the interior cavity of the receptacle.

13. A cable comprising:
a non-water-blocked cable including at least two cable subcomponents and an outer jacket, a section of the at least two cable subcomponents extending from the outer jacket; and
a receptacle defining an interior cavity and including a stop member, a free end of the outer jacket of the cable abutting against the stop member upon insertion of the cable into the cavity, such that the outer jacket of the cable does not extend past the stop member, limiting the cable's insertion depth into the interior cavity of the receptacle, the receptacle further including an end wall at a first end thereof, the end wall defining an aperture for allowing a portion of a cable subcomponent of the cable to extend through the end wall,
wherein the interior cavity of the receptacle defines a cable subcomponent space disposed between the end wall and the stop member, the cable subcomponent space sized to receive two or more cable subcomponents, and a cable space disposed between the stop member and a second end of the receptacle, wherein the portion of the cable subcomponent section is disposed in the cable subcomponent space, and the outer jacket is disposed in the cable space.

14. The cable of claim 13, further comprising a sleeve enclosing the receptacle.

15. The cable of claim 13, wherein the receptacle includes a cylindrical wall.

16. The cable of claim 13, wherein the receptacle includes:
a second end; and
a cylindrical wall extending between the first and second ends of the receptacle,
wherein the cylindrical wall and the end wall are formed as a single unit and defining the interior cavity of the receptacle.

17. The cable of claim 15, wherein the cylindrical wall includes a flange at the second end thereof.

18. The cable of claim 17, wherein the flange is outwardly flared.

19. The cable of claim 15, wherein the cylindrical wall includes an inner surface, the stop member formed on or by the inner surface of the cylindrical wall.

20. The cable of claim 13, wherein the end wall includes a second aperture for allowing a portion of a second cable section of the cable to extend through the end wall, the apertures spreading the cable subcomponents apart from one another to allow the water-blocking compound therebetween.

21. The cable of claim 13, wherein the at least two cable subcomponents include two or more individual EMI shields and further comprising an electrically insulating sleeve disposed between the aperture and the two or more individual EMI shields.

22. The cable of claim 13, wherein the cylindrical wall includes the injection port.

23. The cable of claim 14, wherein the cable further includes an EMI shield, wherein the EMI shield comprises a free end folded over the outer jacket prior to insertion into the receptacle such that a first portion of the free end of the EMI shield is disposed between the outer jacket and the receptacle, and wherein a second portion of the free end of the EMI shield adjacent the first portion is folded over an exterior of the receptacle after the cable has been inserted into the receptacle such that the second portion is disposed between the receptacle and the sleeve.

24. A method for water-blocking a non-water-blocked cable, the method comprising:
providing a non-water-blocked cable including at least two cable subcomponents and an outer jacket;
providing a receptacle;
inserting the cable into one end of the receptacle so that a first portion of the at least two cable subcomponents are disposed in a cable subcomponent interior space of the receptacle, a second portion of the at least two cable subcomponents extend through a corresponding at least two apertures in an end wall of the receptacle, and a free end the outer jacket is disposed in a cable interior space of the receptacle and abutting against a stop member upon insertion of the cable into the cable interior space, such that the outer jacket of the cable does not extend past the stop member; and
delivering, through a port in the receptacle, a water-blocking compound,
wherein the cable comprises an EMI shield arranged between the at least two cable subcomponents and the outer jacket, and wherein the method further comprises the steps of:
folding a free end of the EMI shield over the outer jacket prior to inserting the cable into the receptacle, and
folding the free end of the EMI shield over an exterior of the receptacle after the cable has been inserted into the receptacle.

25. The method of claim 24, further comprising applying a sleeve over the receptacle.

26. The device of claim 1, further comprising a water-blocking compound disposed in the cable subcomponent space.

27. The cable of claim 13, further comprising a water-blocking compound disposed in the interior cavity of the receptacle and sealingly encapsulating a portion of the at least one cable subcomponent section disposed in the interior cavity of the receptacle.

28. The device of claim 1, wherein the receptacle includes a cylindrical wall and the stop member comprises a circumferential rib formed about an inner surface of the cylindrical wall of the receptacle.

* * * * *